Oct. 8, 1935.　　　　I. I. SIKORSKY　　　　2,016,394
RETRACTABLE SHOCK ABSORBING STRUT
Original Filed April 12, 1929
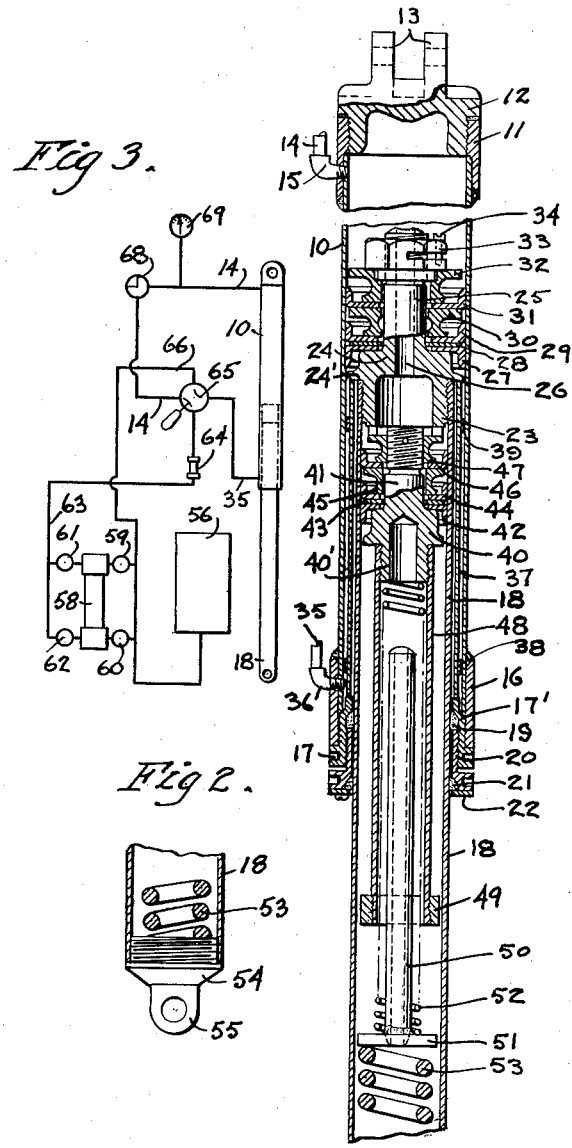
Igor I. Sikorsky
INVENTOR.
BY
ATTORNEY Patented Oct. 8, 1935

2,016,394

UNITED STATES PATENT OFFICE 2,016,394

RETRACTABLE SHOCK ABSORBING STRUT

Igor I. Sikorsky, Nichols, Conn., assignor, by mesne assignments, to United Aircraft Corporation, a corporation of Delaware Original application April 12, 1929, Serial No. 354,552. Divided and this application December 6, 1930, Serial No. 500,454

14 Claims. (Cl. 267—34)

The present invention relates to a hydraulic shock absorber adapted for use in various connections, but particularly applicable to the landing gear of aircraft. While the device to be hereinafter described will be considered principally from the viewpoint of a shock absorber, in the illustrated embodiment the two principal component members are shown as being adapted to be extensible and retractable for the purpose of projecting and retracting aircraft landing wheels or their equivalent.

The present application is a division of my copending application Serial No. 354,552, filed April 12, 1929.

In the accompanying drawing:

Figure 1 is a longitudinal section of the upper portion of the shock absorber.

Figure 2 is a similar section of the lowermost portion of the shock absorber, and Figure 3 is a diagram showing a hydraulic system for controlling relative movements of the shock absorber parts when such movement is required.

Referring to the drawing, reference numeral 10 denotes a cylinder having an internally threaded ring 11 welded to its upper end, a cap 12 having a threaded skirt engaging the threads of the ring to form a closure for the cylinder. Integral with the cap 12 are attachment lugs 13.

Supply tube 14 for a fluid medium such as oil, glycerine or the like is in connection with the upper end of cylinder 10 through an elbow 15.

The lower end of the cylinder has welded thereto a collar 16 whose projecting end is internally threaded to be engaged by the threaded skirt of a hollow plug 17. A piston 18 extends within cylinder 10 to form a variable chamber in the upper end of the cylinder and a tight fit is insured by means of a compressible washer 19 engaged on one side by a shoulder 17' of a plug 17 and on the other by the end of a threaded ring 20 engaging internal threads of plug 17. A second compressible washer 21 is disposed in an annular recess of a radially expanded head of ring 20 and held therein by a screw attached washer 22.

Cylinder 18, which is hollow, has internal threads at its upper end engaging the threaded skirt 23 of a plug 24, this plug having a central upwardly extending neck 25 threaded at its upper end, the plug and neck being provided with an axial through bore 26.

Arranged on neck 25 of plug 24 are a downwardly faced packing cup 27, a washer 28, an upwardly faced packing cup 29, a washer or spacer 30, a second upwardly faced cup 31, a spacer 32 and finally, a nut 33 engaging the threads at the upper end of the neck, the nut being provided with a locking device 34.

A tube 35 leads to the lower end of cylinder 10 through an elbow 36 and by forcing liquid into the cylinder through one or the other of tubes 14 and 35 and allowing it to escape through the other, the piston head, which has just been described, may be caused to reciprocate, piston 18, of course, participating in its movements. Outward movement of the head, however, is positively limited by means of a sleeve 37 interposed between cylinder 10 and piston 18 in spaced relation to the walls of each, one end of the sleeve normally resting on the inner edge of the skirt of plug 17 and the other end being adapted to be abutted by a projecting shoulder 24' of plug 24 in the movement of the latter outwardly of the cylinder. The spaced relation of sleeve 37 is maintained by means of spacing rings 38 and 39 secured to the sleeve adjacent its ends.

When the piston assumes its projected position, relative to the cylinder, and the fluid above the piston head is locked in the cylinder, the device functions as a shock absorber due to the following provisions.

Interiorly of piston 18 is disposed a plug 40 having an upwardly extending stud 41 provided with threads at its upper end portion. Arranged on this stud are a downwardly faced packing cup 42, a washer 43, an upwardly faced packing cup 44, a spacer 45, a second upwardly faced cup 46 and a nut 47 having an upper castellated face adapted to abut the lower edge of sleeve 23 the plug and washers constituting a piston to form a second variable chamber in the upper end of the cylinder 18 connected with the variable chamber in the upper end of the cylinder 10 by means of the restricted bore 26. In screw engagement with a skirt 40' of plug 40 is a sleeve 48 which at its lower extremity has threaded thereon a spacer ring 49. Extending within sleeve 48 is a pin 50 having at its lower end a radially expanded flange 51 on which seats the lower end of a compression spring 52 whose upper end is in abutment with the lower extremity of skirt 40'. Beneath flange 51 a compression spring 53 of relatively greater strength than spring 52 is disposed, this spring having its lower end seated against the screw plug 54 which closes the lower end of the piston. Plug 54 has an integral attachment lug 55.

When, as discussed above, fluid is locked in the upper chamber of the cylinder and compressive forces are exerted on members 11 and 18 to cause inward movement of the latter relative to the former, fluid is forced through bore 26 and causes the depression of plug 40 against the resistance of spring 52. If the compressive force is extraordinarily great, the yielding of spring 52 will permit the upper end of pin 50 to enter skirt 46' and the lower end of sleeve 48 to abut flange 51. Hereupon, further downward movement of plug 40 is received by spring 53 through the positive transmission element 48. It will thus be seen that while ordinary shocks will be absorbed by spring 52, extraordinary shocks are positively transmitted upon a predetermined compression of that spring to the relatively stronger spring 53.

An operating system for the cylinder and piston elements, including means for locking fluid in the upper portion of cylinder 10 is shown in Figure 3. According to this diagram a reservoir for the pressure medium is indicated at 56, 57 indicating a tube in connection with a double cylinder pressure pump 58 through check valves 59 and 60. The pump outlets are connected through check valves 61 and 62 with a line 63 leading through check valve 64 to one port of a four-way valve 65. By suitable manipulation of the valve, line 63 may be connected either into line 14 or line 35 and simultaneously the other of lines 14 and 35 is connected through the valve to a return line 66 which leads to the pump inlets and supply line 57. Arranged in line 14 is a globe valve 68 and interposed between the latter and the cylinder is a pressure gauge 69.

Thus by suitably manipulating the valve, fluid under pressure may be introduced into the cylinder at either end thereof and withdrawn from the other end. Check valves 61, 62, and 64 prevent the return of the pressure fluid through line 63 and thus serve to lock the liquid in either end of the cylinder. Also by lapping the ports of valves 65 the liquid in the cylinder may be similarly confined. Further, by closing globe valve 68 the liquid may be positively locked in the upper end of cylinder 10, intermediate portion of line 14 and the tap line leading to the pressure gauge.

It will be understood that the system illustrated in Figure 3 is not essential to the present invention and the device will function as a shock absorber if the chamber above the head of piston 18 is filled with a hydraulic medium and elbow 15 replaced by a solid plug. Such a plug, however, would be no more than the equivalent of the various non-return means interposed between the upper end of the cylinder and pressure generator 58.

It will be understood that I do not limit myself to the embodiment of my invention shown and described, the scope of the invention being defined in the following claims.

I claim:

1. A shock absorber comprising cylinder and piston elements, the cylinder chamber on one side of the piston being filled with fluid, means defining another chamber adapted to receive fluid expelled from the cylinder chamber upon movement of the piston inwardly of the cylinder, a portion of said chamber-defining means being yieldable, compressible means of relatively small force opposing the initial yielding movement of said portion, and further compressible means of relatively large force opposing the continued movement thereof.

2. A shock absorber comprising cylinder and piston elements, the cylinder chamber on one side of the piston being fluid-filled, means defining another chamber adapted to receive fluid expelled from the cylinder chamber upon movement of the piston inwardly of the cylinder, a portion of said chamber-defining means being yieldable, compressible means of relatively small force opposing the initial yielding movement of said portion, further compressible means of relatively large force, and means to positively transmit to said further compressible means movement of said portion upon compression of said first compressible means to a predetermined degree.

3. A shock absorber comprising cylinder and piston elements, the cylinder chamber on one side of the piston being fluid filled a member movable under the force of the fluid when the piston is moved inwardly of the cylinder, compressible means of relatively small force opposing the initial movement of said member, and further compressible means of relatively large force opposing the continued movement of said member.

4. A shock absorber comprising cylinder and piston elements, the cylinder chamber on one side of the piston being fluid filled, a member movable under the force of the fluid when the piston is moved inwardly of the cylinder, compressible means of relatively small force opposing the initial movement of said member, further compressible means of relatively large force, and means to positively transmit to said further compressible means movement of said member upon compression of said first compressible means to a predetermined degree.

5. In a shock absorber, a cylinder, a piston within said cylinder, the cylinder chamber on one side of said piston being fluid-filled, a hollow piston rod in connection with said piston, said piston having a passage therein communicating said cylinder chamber with the interior of said piston rod, a piston in said piston rod and movable to admit to the latter fluid expelled from said chamber upon movement of the first mentioned piston inwardly of the cylinder, compressible means of relatively small force initially opposing such displacement of said second piston, and further compressible means of relatively large force opposing the continued movement thereof.

6. In a shock absorber, a cylinder, a piston within said cylinder, the cylinder chamber on one side of said piston being fluid-filled, a hollow piston rod in connection with said piston, said piston having a passage therein communicating said cylinder chamber with the interior of said piston rod, a piston in said piston rod and movable to admit to the latter fluid expelled from said chamber upon movement of the first mentioned piston inwardly of the cylinder, compressible means of relatively small force initially opposing such displacement of said second piston, further compressible means of relatively large force, and means to transmit movement of said second piston thereto upon compression of said first compressible means to a predetermined degree.

7. In a shock absorber, a cylinder, a piston therein, the cylinder chamber on one side of the piston being fluid-filled, a hollow piston rod in connection with said piston, said piston having a passage therein communicating said cylinder chamber with the interior of said piston rod, a piston in said piston rod and movable to admit to the latter fluid expelled from said chamber upon movement of the first-mentioned piston inwardly of the cylinder, and a relatively weak spring and a relatively strong spring interposed between said second piston and an outer end closure of said piston rod.

8. In a shock absorber, a cylinder, a piston therein, the cylinder chamber on one side of the piston being fluid-filled, a hollow piston rod in connection with said piston, said piston having a passage therein communicating said cylinder chamber with the interior of said piston rod, a piston in said piston rod and movable to admit to the latter fluid expelled from said chamber upon movement of the first-mentioned piston inwardly of the cylinder, and a relatively weak helical spring and a relatively strong helical spring in end to end relation interposed between said second piston and an outer end closure of said piston rod.

9. In a shock absorber, a cylinder, a piston therein, the cylinder chamber on one side of the piston being fluid-filled, a hollow piston rod in connection with said piston, said piston having a passage therein communicating said cylinder chamber with the interior of said piston rod, a piston in said piston rod and movable to admit to the latter fluid expelled from said chamber upon movement of the first-mentioned piston inwardly of the cylinder, a relatively weak helical spring and a relatively strong helical spring in end to end relation interposed between said second piston and an outer end closure of said piston rod, and a member for positively transmitting movement of said second piston to said relatively strong spring upon compression of the other spring to a predetermined degree.

10. In a shock absorber, a cylinder, a piston therein, the cylinder chamber on one side of the piston being fluid-filled, a hollow piston rod in connection with said piston, said piston having a passage therein communicating said cylinder chamber with the interior of said piston rod, a piston in said piston rod and movable to admit to the latter fluid expelled from said chamber upon movement of the first-mentioned piston inwardly of the cylinder, a relatively weak helical spring and a relative-strong helical spring in end to end relation interposed between said second piston and an outer end closure of said piston rod, and a tubular member surrounding said relatively weak spring for a portion of its length and adapted upon a certain compression of the latter to transmit further movement of said second piston to said relatively strong spring.

11. In a shock absorber, a cylinder, a piston therein, a piston rod, a closure member for one end of the cylinder and a sleeve surrounding said piston rod adapted to limit the movement of the piston in one direction and means secured to said sleeve adapted to position said sleeve centrally of said cylinder, 12. A shock absorber comprising cylinder and piston elements the cylinder chamber on one side of the piston being filled with fluid adapted to resist relative movement of the cylinder and piston, means adapted to exert a relatively small force initially opposing such relative movement, and means adapted to exert a relatively large force opposing continued movement thereof.

13. A shock absorber comprising cooperating cylinder and piston elements, the cylinder chamber on one side of the piston being filled with fluid adapted to resist relative movement of the cylinder and piston elements, an orifice through which said fluid may flow, means adapted to exert a relatively small force opposing the initial flow of said fluid, and means adapted to exert a relatively large force opposing continued flow of said fluid.

14. In a hydraulic shock absorber for absorbing shocks incident to the operation of an airplane while in contact with land, in combination, a variable liquid-filled chamber, a second variable chamber connected to said first mentioned chamber by a restricted bore, means for transmitting shock forces to said absorber, said forces acting to reduce the volume of said first mentioned chamber and constrain the liquid to flow from said first mentioned chamber to said second mentioned chamber through said bore, said action serving to absorb at least a portion of said forces, and means to assist said liquid to absorb said shock forces comprising, a resilient means resisting change in the volume of said second variable chamber up to a predetermined extent, and a second resilient means of greater resistance than said first mentioned resilient means resisting increase in the volume of said second variable chamber beyond said predetermined extent.

IGOR I. SIKORSKY.